Sept. 19, 1967  M. MULOT  3,342,087
DRILLING DEVICE
Filed Dec. 21, 1964  2 Sheets-Sheet 1

INVENTOR.
MARCEL MULOT
BY Hopgood and Calimafde
ATTORNEYS

Sept. 19, 1967  M. MULOT  3,342,087
DRILLING DEVICE

Filed Dec. 21, 1964  2 Sheets-Sheet 2

INVENTOR.
MARCEL MULOT
BY  *Hopgood and Calimafde*

ATTORNEYS

United States Patent Office 3,342,087
Patented Sept. 19, 1967

3,342,087
DRILLING DEVICE
Marcel Mulot, Villeurbanne, Rhone, France, assignor to The New Britain Machine Company, New Britain, Conn., a corporation of Connecticut
Filed Dec. 21, 1964, Ser. No. 419,897
3 Claims. (Cl. 77—32.3)

ABSTRACT OF THE DISCLOSURE

The invention relates to a drilling machine in which the feeding advance of the drill-bit is governed in accordance with a stepped program cycle, characterized by a drill-bit retraction in the periods of transition overlapping the end of one step and the commencement of the next step. The feed mechanism includes two coordinated concurrently operative cams, with followers loaded into following contact. A lost-motion connection characterizes the relation between the drill-chuck and the follower of a stepped feed-determining cam, and retraction mechanism is programmed by the other cam.

The present invention relates to improvements in or relating to a drilling device.

In drilling deep holes the chips have a tendency to clog in the spiral grooves of the drills in such manner that they are difficult to clear and it becomes necessary to withdraw the drill from the work piece from time to time, in order to clear the chips.

To withdraw the drill, recourse can be had to mechanical devices comprising an auxiliary drive forming part of the drilling machine, but in the known devices of this kind, the time required for the execution of this operation of withdrawing the drilling bit and returning it in place is of excessively long duration during the drilling cycle for the production of a large series of holes.

According to the present invention there is provided a drilling device including an axially-movable drill chuck adapted to rotate relatively to a work-piece holder, a double-acting ram actuated by a pressure fluid adapted to produce the aforementioned axial displacement in either direction, a movable programming element, continuously driven and incorporating on the one hand a programming cam controlling the action of the ram selectively in the direction of an axial forward feed of the drill chuck during successive periods of predetermined length, and in the reverse direction during the intervals between the aforesaid periods of advance and on the other hand a speed limiting cam arresting the forward feed in accordance with a predetermined programme.

In one form of embodiment, the ram is arranged in such manner that its axis is parallel to that of the drill-chuck, and one of its two elements, consisting of the cylinger and the piston, is fixed, whereas the other element is connected with the aforesaid drill-chuck and carries a roller coacting with the limiting cam of the forward feed motion.

The invention will be better appreciated from a perusal of the following description and examination of the attached drawings which represent diagrammatically, an exemplary embodiment of the drilling device according to the present invention.

Figure 1:
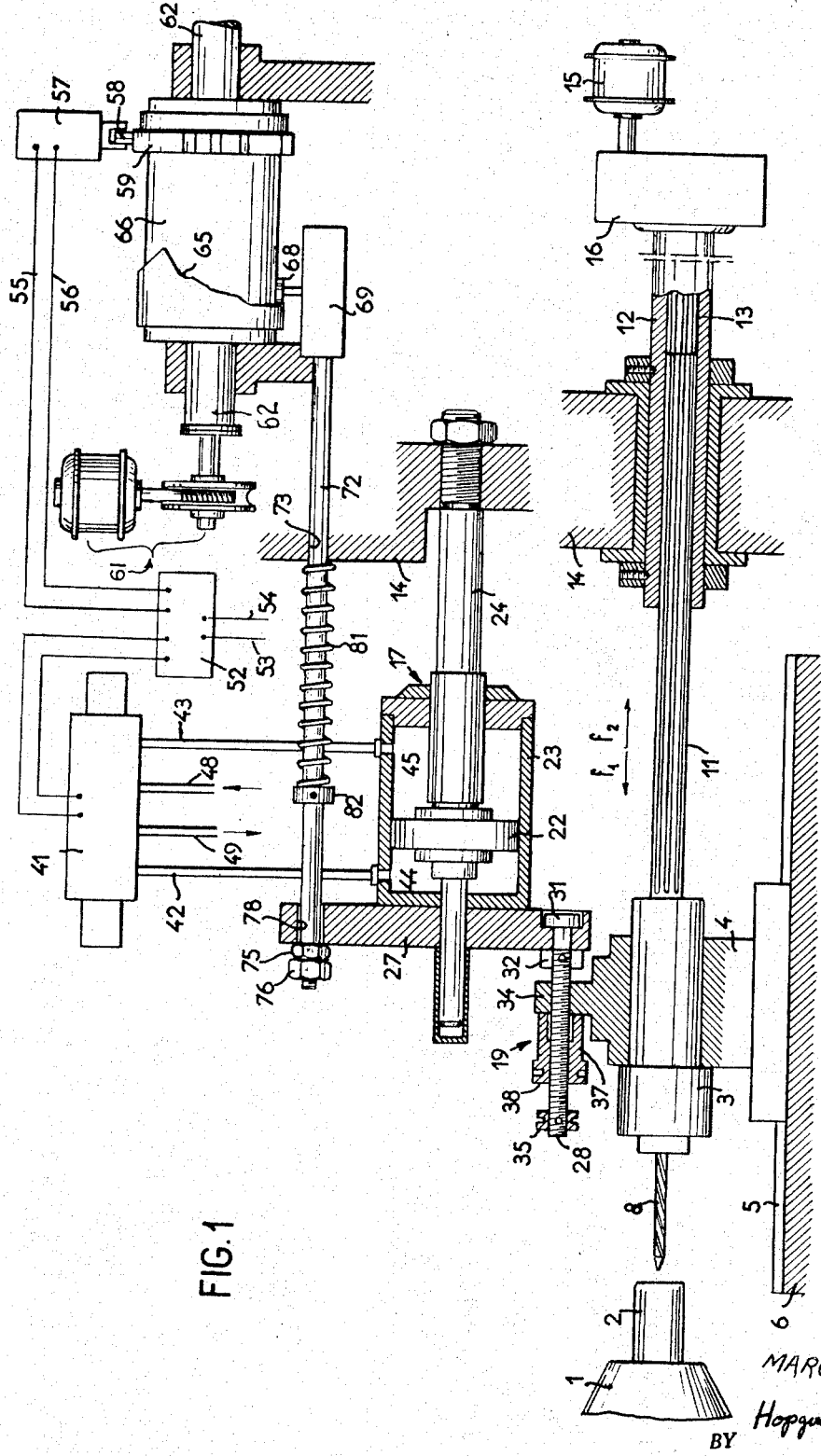
FIG. 1 is a diagrammatic general view of the drilling device.

The drilling device represented in FIG. 1 comprises, in the axis of a work carrier 1 carrying the work piece 2, a rotating drill chuck 3 fitted in a bearing 4 which is engaged with and movable along slides 5 of a tool-carrying capstan head 6, these slides 5 being parallel to the common, geometric axis of the work carrier 1 and the drill chuck 3, in which a drill 8 is carried.

The rotating drill chuck 3 is driven by an assembly of a grooved spindle 11 integral with the said chuck and sliding in a tubular shaft 12 having corresponding internal splines 13, said tubular shaft 12 being rotatably carried in an element 14 of the machine frame and being rotated at a predetermined speed from any suitable power take-off, for example an electric motor 15 with a change-speed gearbox 16. The geometrical common axis of the grooved (splined) spindle 11 and the correspondingly grooved tubular shaft 12, is obviously parallel with the direction of the slides 5.

The advance motion of the drill chuck 3 on the capstan head 6 and its return stroke, are separately controlled by means of an adjustable coupling designated as a whole by 19, and by means of a pressure-fluid ram such as a compressed-air ram 17, the axis of which is parallel with the direction of the slides 5.

The compressed-air ram 17 includes a piston 22, a cylinder 23 and a piston rod 24 attached by its threaded end in a corresponding part of the machine frame 14, said cylinder 23 carrying a driving flange 27, linked with the coupling 19.

The adjustable coupling 19 comprises a threaded spindle 28, one end of which passes through the flange 27 and is mounted in such manner as to be able to rotate without axially sliding, and for this purpose is influenced by a cylindrical head 31 located on the side of the flange furtherest from the spindle, and a nut 32, keyed to said spindle 28, and located on the other side of the flange, the spindle then passing through a tapped hole in boss 34 which forms part of the bearing 4 on which the rotating drill chuck 3 is fitted.

For the purpose of rotating the spindle 28, the free end of said spindle carries a keyed nut 35, having on its circumference a number of regularly spaced holes, such as to receive a pin key by which it can be rotated.

The adjustable coupling 19 enables the bearing 4 to be set in any longitudinal position which may be required with reference to the driving flange 27, simply by rotating the spindle 28 in either direction. When the correct setting has been obtained, the spindle 28 is locked by means of a nut 37 screwed thereon and bearing against one face of the boss 34, the said nut having also a head 38, likewise having on its circumference, radial holes to receive a pin key.

The ram 17 is double-acting. The admission and exhaust of the working fluid are controlled by an electric valve 41 through pipes 42 and 43 respectively communicating with the chambers 44 and 45 of the said ram. The electric valve 41 is fed with compressed air from any suitable source (not shown), through a pipe 48, while the exhaust to atmosphere is effected through a further pipe 49.

The electric valve 41 has, in the conventional manner, a two-position slide. In one of these positions, the slide places the feed pipe 48 in communication with the chamber 44 of the ram 17; while the other chamber 45 is open to exhaust; and in its other position, the compressed-air feed pipe 48 is placed in communication with the chamber 45 of the ram, and the other chamber 44 is opened to exhaust.

The electric valve 41 is controlled by a relay 52, connected through the conductors 53, 54 with any suitable source of current, and by the conductors 55, 56 with the two terminals of a micro-switch 57, actuated by a programming cam 59.

The programming cam 59 is of the disc type and is carried on a shaft 62 slowly rotated at a speed corresponding to the speed of advance of the drill in the work piece 2, by any suitable motion gear, for example electric-motor and reduction-gear means 61.

Figure 2:
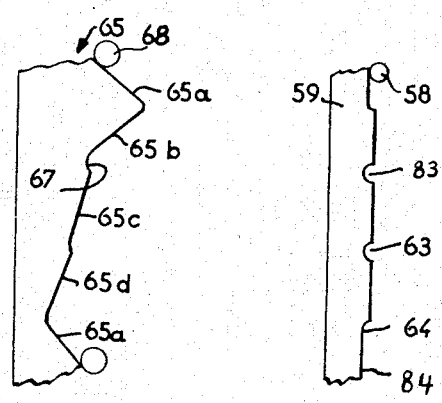
FIG. 2 shows, side by side, the corresponding shapes (profiles) of the limiting cams for the advance or forward feed and the information register.

The programming cam 59 thus possesses a cylindrical surface against which a roller 58 of the micro-switch 57 is elastically held (i.e., resiliently loaded). This cylindrical surface is provided with recesses shown at 83, 63, 64 and 84 (FIG. 2) corresponding to the positions in the forward feed stroke of the drill at which the withdrawal or clearing of the said drill is required; when the roller 58 of the micro-switch 57 bears against the cylindrical surface of the cam 59, the electric valve 41 is energized and its slide places the ram chamber 44 in communication with the compressed-air supply, in such manner as to cause the drill chuck 3 to move in the direction of the forward feed of the drill. On the contrary, when the roller 58 drops into a recess, e.g. 83, the electric valve 41 is de-energized and its slide then occupies the position in which it directs the compressed-air into the chamber 45 of the ram to effect the quick return motion of the drill chuck 3.

In order to obtain a strictly determined rate of forward feed of the drill, a speed-limiting cam is provided, for example a drum cam 65 carried on a drum 66 fitted on the shaft 62 already carrying the programming cam 59. This drum cam 65 coacts with a roller 68 fitted on a sliding block 69 carried on a rod 72 working in a bore 73 of the machine frame 14, in a direction parallel to the longitudinal axis of the ram.

The other end of this rod 72 carries an adjustable feed stop comprising a nut 75 with a counter-nut 76. The part of the rod 72 adjoining this end, slides freely in a bore 78 of the flange 27. Rod 72 may thus be said to establish a lost-motion connection between flange 27 and the follower roll 68.

Means are incorporated for preventing collisions of the roller 68 with the drum cam 65; for this purpose, the said roller is held elastically against the said cam 65 at least during the return stroke of the drill chuck 3 by means of a coil spring 81 which is fitted on the rod 72 and the other end whereof is attached to a ring 82 keyed to the said rod. Thus, in the form shown, spring 81 serves continuously to resiliently load roll 68 in following contact with cam 65.

The drum cam 65 incorporates a cam face 65b for a first cutting period, a face 65c for a second such period, a face 65d for a third drilling stroke, and a face 65a for the return stroke of the drill. The slopes of these different faces control the rate of axial advance of the drill in the work piece 2.

Figure 3:
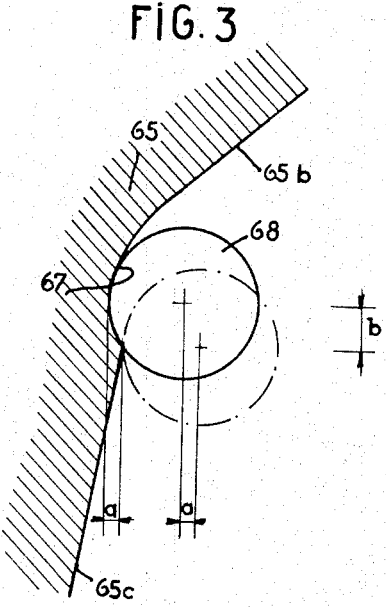
FIG. 3 shows on a larger scale, a detail of the limiting cam for the forward feed motion.

The face 65c for the second drilling stroke starts at a slight distance $a$ short of the end of the face 65b for the first drilling stroke for a reason which will presently be explained (FIG. 3). Similarly, the face 65d for the third drilling period starts at a distance $a$ short of the end of the face 65c.

The manner of action of this device is as follows:

The machine, assumed to be properly adjusted, is started by energizing relay 52. The roller 58 of the micro-switch 57 pushed by the programming cam 59, energizes the winding of the electric valve 41, the slide whereof, consequently, admits compressed air into the chamber 44 of the ram 17. The cylinder 23 of the ram 17 is thus forced in the direction of the arrow $f_1$, i.e. towards the left in FIG. 1, and continues to move in this direction until the flange 27 strikes against the nut 75, the location of which in space is itself determined by contact of the roller 68 with the crest of the return-stroke face 65a of the drum cam 65. The drill 8 is thus close up to the work-piece 2, but not yet able to start cutting. The drum 66 rotates slowly and the face 65b for the first drilling period presently moves under the roller 68 and rolls under it, thus enabling the flange 27 and, through the intermediary of the coupling 19, the drill-chuck 3 to move forward in the direction of the arrow $f_1$, by the force of the compressed air in the ram 17. The drill 8 commences to cut, continuing until the roller 58 of the micro-switch 57 drops into the first recess 83 of the programming cam 59. At this instant, the roller 68 is opposite a recess 67 at the end of the first-stage face 65b on the drum cam 65. The opening of the micro-switch 57 reverses the feed to the ram 17 such that the compresed air is now admitted to the chamber 45 of the said ram, abruptly forcing back the cylinder 23 of this ram in the direction of the arrow $f_2$ (to the right in FIG. 1), and the cylinder 23 draws with it the drill 8 which rapidly disengages from the work-piece 2 being drilled. During this return stroke of the ram, the flange 27 slides along the rod 72, the rod 72 remaining in position due to the presence of the spring 81, such that the roller 68 is held in contact with the drum cam 65, and thereby preventing any jerky action which might damage the mechanism.

The programming cam 59 which continues to rotate at a steady rate, almost immediately causes the roller 58 of the micro-switch to leave the first notch 83 of said cam 59 and rise again towards the cylindrical surface thereof, in such manner that the electric valve 41 is again energized and reverses the feed to the ram in the direction of advance of the drill. However, during this to-and-fro movement of the drill, the drum cam 65 has also continued to rotate, so that the roller 68 does not drop exactly into the notch 67 of the said cam, but strikes the start of the face 65a for the second drilling cycle, i.e. at a distance $a$ (FIG. 3) short of the feed position at the end of the first drilling cycle so that the drill does not rub against the bottom of the hole already drilled, and enters the work piece freely as soon as the roller 68 has travelled through the same distance $a$ corresponding to a peripheral travel $b$ of the drum cam 65.

In a similar fashion, the second drilling period is continued to the end of the face 65c of the drum cam 65 and at that instant, the programming cam 59 initiates another return stroke, followed by another forward stroke of the drill to start the third drilling cycle corresponding to the face 65d of the drum cam.

Thus, the withdrawal of the drill is performed automatically and very rapidly, during time intervals which count for little by comparison with the actual drilling times of the cycle.

For each, individual drilling operation, a drum cam and a programming cam require to be appropriately designed and prepared. The cam shapes will depend on the diameter and the length of the hole to be drilled, which determine the desirable number of withdrawals of the drill.

In a modification of the device for drilling large-diameter holes, the compressed-air ram may be replaced by a hydraulic ram, with a higher working pressure corresponding to the force necessary for the drill to penetrate the work-piece, the delivery of the hydraulic pump feeding the ram being then so adjusted that the withdrawal times necessary, do not exceed suitable, predetermined values.

What I claim is:

1. A drilling device for drilling holes in a workpiece while the workpiece is supported in a carrier comprising
drill chuck means carrying a drill bit,
means to rotate said drill chuck means including means to guide the axial movement of said drill chuck means including bearing and slide means,
reciprocating means to axially reciprocate said drill chuck means forwardly and rearwardly,
including fluid operated motor means having a cylinder and piston rod,
adjustable coupling means coupling said reciprocating means and said drill chuck means,
a flange secured to said reciprocating means,
said adjustable coupling means including a threaded spindle passing through said flange and having a head engaging said flange, said spindle also being secured to said drill chuck means for coupling movement thereto, means to control the forward and rearward movement of said reciprocating means including valve means operable in two positions to selectably control said movement, switch means to actuate said valve means including a microswitch element and a relay, said microswitch controlling said relay, first control means to open and close said switch means in a programmed sequence, including a first rotatable cam having a programmed cylindrical surface, said microswitch element including a roller elastically held against said cam, said programmed surface of said first rotatable cam including recesses, cam rotating means to rotate said cam and to support said cam in corresponding relationship wtih the movement of said drill means to position said recesses against said roller when said drill means is at its maximum forward stroke, whereby said drive means is moved rearwardly when said roller is in one of said recesses, second control means to determine the extent of forward movement of said drill means, including a drum cam rotatably carried by said cam rotating means, said second control means including second roller means riding said drum cam and a rod establishing a lost-motion connection between said second roller means and said flange, means resiliently loading said rod in the direction to maintain said second roller means in following contact with said drum cam, a stop on said rod determining a forward position limit of said flange with respect to said rod, said drum cam having a plurality of cam surfaces, one for each drilling stroke for any single work object, the intersecting regions of said cam surface being formed so that the beginning of the next successive surface is offset from the ending of the prior surface, whereby the drill is free from rubbing against the bottom of the hole already drilled.

2. A drilling device for drilling holes in a workpiece while the workpiece is supported in a carrier comprising drill chuck means adapted to carry a drill bit, means to rotate said drill chuck means, reciprocating means including double-acting fluid-pressure operated means to axially reciprocate said drill chuck forwardly and rearwardly, means coupling said reciprocating means to said drill chuck means, means to control the forward and rearward movement of said reciprocating means, said control means including rotatable program cam means having two coordinated concurrently operative profiles per cycle, first follower means resiliently loaded into following contact with a first of said profiles and including a lost-motion connection to said drill-chuck means, said lost-motion connection including a stop determining a limiting forward displacement of said drill-chuck means with respect to said follower means, second follower means resiliently loaded into following contact with the second of said profiles and including a control connection to said fluid-pressure operated means, and having a first position determining retracting reciprocation of said drill-chuck and a second position determining forward reciprocation thereof, said first profile being characterized by a succession of stepped feed-limiting slopes, and said second profile being so characterized as to transiently actuate said second follower means to said first position for periods overlapping transition from one to the next of said slopes, whereby a given drill-feed cycle determined by said program cam means determines successive drill-bit feed advances according to the steps of said first profile, interlaced with drill-bit retractions between said steps.

3. A drilling device for drilling holes in a workpiece while the workpiece is supported in a carrier comprising drill chuck means carrying a drill bit, means to rotate said drill chuck means including means to guide the axial movement of said drill chuck means including bearing and slide means, reciprocating means to axially reciprocate said drill chuck forwardly and readwardly, including fluid operated motor means including a cylinder and piston rods, adjustable coupling means coupling said reciprocating means and said drill chuck means.

a flange secured to said reciprocating means, said adjustable coupling means including a threaded spindle passing through said flange and having a head engaging said flange, said spindle also being secured to said drill chuck means for coupling movement thereto, means to control the forward and rearward movement of said reciprocating means, including valve means operable in two positions to selectably control said movement, said control means including a rotatable cam having a programmed cylindrical surface, said programmed surface including recesses, cam rotating means to rotate said cam and to support said cam in corresponding relationship with the movement of said drill means to position said recesses against said roller when said drill means is at its maximum forward stroke, whereby said drill means is moved rearwardly when said roller is in one of said recesses, second control means to limit the forward movement of said drill means, said second control means including second roller means riding said drum cam and a rod establishing a lost-motion connection between said second roller means and said flange, means resiliently loading said rod in the direction to maintain said second roller means in following contact with said drum cam, a stop on said rod determining a forward position limit of said flange with respect to said rod, said drum cam having a plurality of cam surfaces, one for each drilling stroke for any single work object, the intersecting regions of said cam surfaces being formed so that the beginning of the next successive surface is offset from the ending of the prior surface, whereby the drill is free from rubbing against the bottom of the hole already drilled.

References Cited

UNITED STATES PATENTS

| | | | |
|---|---|---|---|
| 2,727,413 | 12/1955 | Fausek et al. | 77—32.3 |
| 2,791,135 | 5/1957 | Twamley | 77—32.3 |

FRANCIS S. HUSAR, *Primary Examiner.*